United States Patent Office 2,739,987
Patented Mar. 27, 1956

2,739,987

PRODUCTION OF FLUORINE-SUBSTITUTED ETHYLENICALLY UNSATURATED ETHERS

Robert P. Ruh, Midland, Mich., assignor to The Dow Chemical Company, Midland, Mich., a corporation of Delaware No Drawing. Application June 2, 1950, Serial No. 165,874

1 Claim. (Cl. 260—614)

This invention relates to the production of fluorine-substituted ethylenically unsaturated ethers and, more particularly, to the production of such compounds by a reaction involving a substituted ethylene and an acyclic monohydroxy-hydrocarbon.

U. S. Patent 2,409,274, issued to Hanford and Rigby on October 15, 1946, discloses the production of "polyfluoro organic ethers" from "polyfluoroethylenes containing at least three halogen atoms," and requires that the "polyfluoroethylenes" have the "general formula $$CF_2=CX_2$$

where one X is selected from the group consisting of hydrogen and haolgen and the other X is halogen." The method of Hanford and Rigby produces only saturated ethers, and involves, apparently, a simple addition reaction; the addition is illustrated by Example 1 of their patent, which shows the addition of ethyl alcohol to tetrafluoroethylene to produce 1,1,2,2-tetrafluoroethyl ethyl ether.

The present invention is based upon the discovery that fluorine-containing ethylenically unsaturated ethers are produced by an entirely different reaction which proceeds with related, but significantly different, starting materials.

According to the invention, a fluorine-substituted ethylenically unsaturated aliphatic ether is produced from a substituted ethylene and an acyclic monohydroxy-hydrocarbon having not more than four carbon atoms; the fluorine-substituted unsaturated aliphatic ether is produced from the above starting materials by means of a reaction that proceeds in the presence of a base. The substituted ethylene that is used is one having the general formula

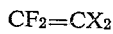

in which $a$ is hydrogen, —$CF_3$, or a halogen of atomic weight between 35 and 80 (i. e., chlorine or bromine), one of the radicals $x$ and $b$ is a halogen of atomic weight less than 80 (i. e., fluorine, chlorine or bromine), and the other is hydrogen or a halogen of atomic weight less than 80.

A preferred embodiment of the invention involves the use, as a starting material, of a substituted ethylene that is a propene having attached to the 1- and 2- carbon atoms, not more than two hydrogens, and from one to three halogens of atomic weight less than 80, including not more than one fluorine attached to either carbon atom, and, attached to the 3-carbon atom, three fluorines.

The fluorine-substituted ethylenically unsaturated ethers that are produced according to the invention have a molecular structure that consists of one OR group attached to one of two carbon atoms joined through an ethylenic double bond; the remaining three valences of these carbon atoms are satisfied by (a) not more than two hydrogens, (b) not more than two halogens of atomic weight less than 80, including not more than one fluorine attached to either carbon atom, and (c) from one to two —$CF_3$ groups. R, as used above, is the residue formed by the removal of one hydroxyl group from an acyclic monohydroxy-hydrocarbon having not more than four carbon atoms. Such fluorine-substituted ethylenically unsaturated ethers are believed to be new compositions of matter, and show promise as fumigants and as polymerizable materials. Certain of these new ethers are also useful in preparing unsaturated fluorine-containing aldehydes and ketones, as described in my co-pending application, Serial No. 165,873, filed June 2, 1950, now Patent No. 2,715,144.

The overall reaction that proceeds according to the method of the invention is illustrated by Equation 1, below, which shows the production of 1-chloro-2-methoxy-3,3,3-trifluoropropene from 1,2-dichloro-3,3,3-trifluoropropene and methyl alcohol, in the presence of potassium hydroxide:

(1)
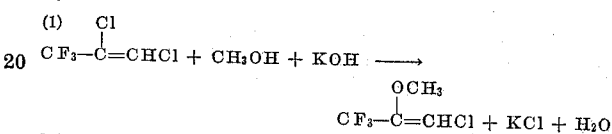

The mechanism of the reaction is not understood; although the experimental results are explained by the hypothesis that the reaction is an addition followed by a dehydrohalogenation, efforts to isolate an addition product have been unsuccessful. So far as is known, if the reaction proceeds under a given set of circumstances it goes to completion but produces no intermediate product.

As has been hereinbefore indicated, the substituted ethylene starting material has the general formula

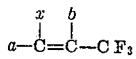

in which $a$, $b$ and $x$ have the meanings previously stated. Compounds represented by this general formula have from three to four carbon atoms, including two joined through an olefinic double bond and from one to two present as part of a —$CF_3$ group. Not more than one —$CF_3$ group is attached to either of the carbon atoms joined through the olefinic double bond, and any substituent other than hydrogen or a —$CF_3$ group is a halogen of atomic weight less than 80. Examples of such substituted ethylene starting materials include the following known compounds: 1,1-dichloro-3,3,3-trifluoropropene, 1-chloro-2,3,3,3-tetrafluoropropene, 1,1,2-trichloro-3,3,3-trifluoropropene, 1,1-dichloro-2,3,3,3-tetrafluoropropene, 1,2-dichloro-1,3,3,3-tetrafluoropropene, 1-chloro-1,2,3,3,3-pentafluoropropene, 2,3,3,3 - tetrafluoropropene, 2 - chloro-1,1,1,4,4,4-hexafluorobutene-2, 1,1,1,2,4,4,4-heptafluorobutene-2, 2,3-dichloro-1,1,1,4,4,4-hexafluorobutene-2, 2-chloro-1,1,1,3,4,4,4-heptafluorobutene-2, and 1,1,1,2,3,4,4,4-octafluorobutene-2. Other substituted ethylene starting materials can be produced from saturated fluorine-containing substituted ethanes by dechlorination, debromination, dehydrochlorination, or dehydrobromination. Such fluorine-containing saturated materials can be produced by vapor-phase chlorination, bromination or combined chlorination and bromination of fluorinated propanes and butanes, and may be used to produce substituted ethylene starting materials in this way.

Some substituted ethylene starting materials are gases and others are liquids under the conditions used for the reaction. In either case, the reaction may be carried out in an open vessel or by adding the starting materials to a pressure vessel. When an open vessel is used the substituted ethylene starting material is added to the acyclic monohydroxy-hydrocarbon; the reaction then proceeds at about room temperature, or at a temperature as high as that of reflux, if desired. When the reaction is carried out in a closed vessel it is conducted at a temperature as high as about 120° C., or as low as about room temperature. When a closed vessel is used there is ordinarily no reason to use a pressure higher than about 100 pounds per square inch gauge, and it is usually preferred to conduct the reaction at a pressure not higher than about 50 pounds per square inch gauge. The reaction is conveniently carried out at atmospheric pressure.

In general, the reaction of the invention is conducted for a period of time sufficiently long that it is substantially complete under the conditions employed. The end-point is conveniently determined by withdrawing periodic samples of liquid from the reaction vessel and titrating to determine alkalinity. Since a base is consumed thereby, the reaction of the invention is substantially complete when successive samples show no variation in alkalinity. The reaction time that is preferred in a given case depends upon the reactants employed, the amounts thereof, the temperature and pressure used, and other variables. Ordinarily it is desired, when a temperature of about 100° C. is used, to continue the reaction for from about two to about ten hours, although no bad effect results from a longer reaction time. In a particular instance the reaction may be substantially complete in a few minutes. Usually, carrying out the reaction for from six to eight hours at such temperature is practicable. When a reaction temperature of about 20° C. is used, it is ordinarily desired to carry out the reaction for from about 2 to about 100 hours, and it is usually practicable to continue the reaction for from 40 to 60 hours.

As is hereinbefore indicated, the reaction of the invention is conducted in the presence of a base. It is usually preferred that the base be provided in the form of an alkali metal, an alkali metal hydroxide, or a salt formed from an alkali metal and an acyclic monohydroxyhydrocarbon having not more than four carbon atoms. It is ordinarily advantageous to use from about 0.75 to about 2.0 mols of the base per mol of the substituted ethylene, and preferred to use from about 1.2 to about 1.5 mols of the base per mol of the substituted ethylene.

The acyclic monohydroxy-substituted hydrocarbons that are used in the practice of the invention have not more than four carbon atoms, and are simple aliphatic alcohols having not more than one ethylenic double bond and no non-ethylenic unsaturation. Examples of acyclic monohydroxy-substituted hydrocarbons include methyl alcohol, ethyl alcohol, propyl alcohols, butyl alcohols, allyl alcohol, methally alcohols, and the like.

The substituted ethylene and the hydroxy-hydrocarbon participate in the reaction in a 1:1 molar ratio. Ordinarily, it is desirable to use the starting materials in approximately the theoretical proportions. The reaction proceeds, however, either with a substantial excess (as much as ten-fold) or with a deficiency (as little as about one-fourth mol of the hydroxy-hydrocarbon per mol of the substituted ethylene) of the hydroxy-hydrocarbon.

In the practice of the invention it is not essential that the substituted ethylene be the starting material actually employed; this material can be produced by the dehydrohalogenation of a saturated compound, and such dehydrohalogenation can be conducted in a vessel containing sufficient amounts of a base and a hydroxy-hydrocarbon for the reaction of the invention, in addition to a sufficient amount of a base for the dehydrohalogenation. The unsaturated ether of the invention is the product recovered.

The following examples illustrate preferred embodiments, but are not to be construed as limiting the invention.

*Example 1*

A fluorine-substituted ethylenically unsaturated aliphatic ether was produced from a substituted ethylene and a saturated mono-hydroxy-hydrocarbon according to the following procedure:

A mixture of dry potassium hydroxide (130 grams) in dry methanol (400 cc.) was added dropwise to a stirred solution of 1,2-dichloro-3,3,3-trifluoropropene (198 grams) in dry methanol (100 cc.). The resulting solution was maintained alkaline to phenolphthalein by additions of the alcoholic KOH, which were made slowly enough that the exothermic reaction did not cause reflux. Agitation was continued at room temperature for three hours after the addition of the potassium hydroxide-methyl alcohol mixture was complete. The excess methyl alcohol present was dissolved in water, and the organic layer was separated, dried over calcium chloride, and fractionated. A mixture of cis and trans 1-chloro-2-methoxy-3,3,3-trifluoropropene (134 grams) was recovered. This corresponds to a 70 per cent yield, based upon the substituted propene charged. The boiling point of the mixture of the cis and trans compounds was from 103° C. to 112° C. at 746 mm. Hg. A sample of the higher boiling isomer was isolated and was found to have the following characteristics: boiling point 111.0° C. at 754 mm. Hg; $n_D^{25}$ 1.3759; density at 25° C. 1.3469 grams per cc.; and molecular refraction found 26.59: theory 26.60.

A procedure similar to that described in the preceding paragraph was employed to produce a chloro-3,3,3-trifluoropropene ethyl ether from 1,2-dichloro-3,3,3-trifluoropropene (407 grams) and dry ethanol (1,000 cc.) in the presence of potassium hydroxide (392 grams). Reaction was complete after about four and one-half hours. After separation of the ethanol, and drying, fractionation yielded 156 grams of the desired ether, which was found to have the following physical properties: boiling point 107° C. at 744 mm. Hg; $n_D^{25}$ 1.3395; density at 25° C. 1.1897 grams per cc.; and molecular refraction found 30.7: theory 31.2.

*Example 2*

A reaction similar to that described in Example 1 was employed to produce allyl 2-chloro-1-(trifluoromethyl)-vinyl ether from 1,2-dichloro-3,3,3-trifluoropropene (165 grams) and dry allyl alcohol (100 cc.) in the presence of potassium hydroxide (84 grams). When the potassium hydroxide addition was complete the mixture was refluxed gently with agitation for one hour. After separation of the alcohol and drying, a 9 gram sample was removed; fractionation of the remainder yielded 23½ grams of recovered allyl alcohol, 26.2 grams of the desired product and 16½ grams of a clear yellow polymer. The allyl 2-chloro-1-(trifluoromethyl)vinyl ether had the following properties: boiling point 110° C. at 730 mm. Hg; density at 25° C. 1.2624 grams per cc.; $n_D^{25}$ 1.3888; and molecular refraction found 34.92: theory 35.36.

*Example 3*

Dry methanol (160 grams), 1-chloro-3,3,3-trifluoropropene (47 grams) and dry potassium hydroxide (34 grams) were placed in a bomb and heated at 100° C. for 19 hours. The excess methyl alcohol present was then dissolved in water, and the organic layer was separated, dried over calcium chloride, and fractionated. One distillation cut recovered consisted of 22 grams of 3,3,3-trifluoropropenyl methyl ether (boiling point 64.1° C. at 751 mm. Hg; $n_D^{25}$ 1.3294; density at 25° C. 1.1568 grams per cc.; molecular refraction found 22.19: theory 21.73).

A procedure similar to that described in the preceding paragraph was employed to produce the corresponding ethyl ether, using 62 grams of 1-chloro-3,3,3-trifluoropropene, 144 grams of ethyl alcohol and 38 grams of sodium ethoxide. The reaction mixture was heated in a bomb for 43 hours on a steam bath. Crude product was removed from the bomb by distillation, and was dried over a mixture of anhydrous calcium chloride and sodium carbonate. Fractionation yielded 35 grams of 3,3,3-trifluoropropenyl ethyl ether (boiling point 83.5° C.–84.1° C. at 744 mm. Hg; $n_D^{25}$ 1.3425; density at 25°

Example 4

A procedure similar to that described in Example 1 was employed to carry out the dehydrochlorination of 306 grams of 1,1-dichloro-3,3,3-trifluoropropane to produce the corresponding propene, and to convert the propene to the unsaturated ethyl ether. The reaction was accomplished in an open vessel at room temperature by adding dropwise as described in Example 1 a mixture of 140 grams of dry potassium hydroxide in 400 cc. of absolute ethanol to the 1,1-dichloro-3,3,3-trifluoropropane. Further absolute ethanol (a total of 200 cc.) was added to keep the reaction mixture fluid during the course of the potassium hydroxide addition. The composition which resulted was refluxed for two and one-half hours. At the end of this reflux additional dry potassium hydroxide (56 grams) and absolute ethanol to maintain fluidity were added, and a further reflux carried out for eight hours. After separation of the ethanol and drying, fractionation yielded 51.5 grams of 3,3,3-trifluoropropenyl ethyl ether.

I claim:

1-methoxy-3,3,3-trifluoropropene.

References Cited in the file of this patent

UNITED STATES PATENTS

| Number | Name | Date |
|---|---|---|
| 2,336,921 | Benning | Dec. 14, 1943 |
| 2,409,274 | Hanford et al. | Oct. 15, 1946 |
| 2,433,844 | Hanford | Jan. 6, 1948 |
| 2,477,342 | McBee et al. | July 26, 1949 |
| 2,522,566 | Chancy | Sept. 19, 1950 |
| 2,574,649 | McBee et al. | Nov. 13, 1951 |
| 2,594,935 | Ladd et al. | Apr. 29, 1952 |

OTHER REFERENCES

McBee et al.: "Fluorinated Ethers," Industrial & Engineering Chemistry, vol. 39, No. 3, pp. 412–415.

Richter: Organic Chemistry, Nordeman Pub. Co., Inc., New York, vol. 1, page 158, 1944.

Bolt: "The Preparation of Certain Fluorochlorohydrocarbons and Their Derivatives," a doctoral thesis, Purdue University, June 1944 (pp. 1–10 of the abstract plus 2 title pages).

Park et al.: Journal of American Chemical Society, vol. 70, April 1948, pp. 1550–1552.